(12) United States Patent
Hasting et al.

(10) Patent No.: US 11,606,535 B2
(45) Date of Patent: Mar. 14, 2023

(54) GATEWAYING OF CONFERENCE CALLS TO BROWSER-BASED CONFERENCES

(71) Applicant: SYNERGY SKY, Olso (NO)

(72) Inventors: Egil Hasting, Drammen (NO); Stale Reitan, Eiksmarka (NO); Birger Lie, Bekkestua (NO)

(73) Assignee: SYNERGY SKY, Olso (NO)

( * ) Notice: Subject to any disclaimer, the term of this patent is extended or adjusted under 35 U.S.C. 154(b) by 0 days.

(21) Appl. No.: 17/334,450

(22) Filed: May 28, 2021

(65) Prior Publication Data
US 2022/0385856 A1  Dec. 1, 2022

(51) Int. Cl.
*H04N 7/15* (2006.01)
*H04N 7/14* (2006.01)
*H04L 12/18* (2006.01)
*H04L 67/133* (2022.01)

(52) U.S. Cl.
CPC ........... *H04N 7/15* (2013.01); *H04L 12/1827* (2013.01); *H04L 67/133* (2022.05); *H04N 7/148* (2013.01)

(58) Field of Classification Search
CPC .............................. H04N 7/15; H04L 12/1827
See application file for complete search history.

(56) References Cited

U.S. PATENT DOCUMENTS

| | | | |
|---|---|---|---|
| 9,300,705 B2 | 3/2016 | Periyannan et al. | |
| 9,699,409 B1* | 7/2017 | Reshef | G06F 3/0484 |
| 2008/0320500 A1* | 12/2008 | Li | G06F 3/038 |
| | | | 719/324 |
| 2014/0029676 A1* | 1/2014 | Abiezzi | G06F 9/452 |
| | | | 375/E7.026 |
| 2014/0313278 A1* | 10/2014 | Periyannan | H04L 65/403 |
| | | | 348/14.08 |
| 2014/0333713 A1* | 11/2014 | Shoemake | H04N 21/44008 |
| | | | 348/14.05 |

OTHER PUBLICATIONS

International Search Report in Application No. PCT/IB2022/054981, dated Sep. 1, 2022.
Written Opinion in Application No. PCT/IB2022/054981, dated Sep. 1, 2022.

* cited by examiner

*Primary Examiner* — Nicholas P Celani
(74) *Attorney, Agent, or Firm* — DLA Piper LLP US

(57) ABSTRACT

Systems and methods for interconnecting point-to-point (P2P) (i.e. SIP/H323) and web browser compatible video conferencing services. The conference platform gatewaying service may use a virtual web browser participant to send and/or receive video and/or audio over VoIP/Video standards, such as SIP/H323 or other point-to-point protocols into a web browser compatible conference by means of a virtual web browser participant. The conference platform gateway service may create a binding between a SIP address and a web meeting URL. When communication is initiated from a compatible peer device to the gateway/server by means of a point-to-point protocol, the gateway/server establishes a connection to the web-based conference using the binding between URI and URL, and establishes a connection between the Point-to-point and Web browser compatible meeting service.

18 Claims, 12 Drawing Sheets

GATEWAYING OF CONFERENCE CALLS TO BROWSER-BASED CONFERENCES

BACKGROUND

Voice and video conferencing equipment that is used in, but not limited to, meeting rooms is typically connected over standard based IP networks and interconnected using protocols like Session Initiation Protocol (SIP) and H.323. Recently, meeting platforms including web browser compatible video conferencing services (e.g., Zoom, Microsoft Teams, Google Meet, Whereby, and the like) have established a new market standard. Clients connect to these platforms through the cloud via a web browser or a platform specific client from a smart phone, platform specific device or personal computer.

Some of these meeting platforms offer standard point-to-point connectivity options like SIP, but others do not. They all however support browser-based access, utilizing web-technology standards for audio, video, and data transmission.

One problem with this way to deploy and operate video conferencing applications is that the meeting platform is created as an isolated stand-alone service, with no or limited ability for interoperability with other conferencing solutions and/or point-to-point devices. As a result, there is no generic way to make the video conferencing applications included in these meeting platforms compatible with voice and video conferencing equipment that connects over standard based IP networks using protocols such as SIP, H.323, and the like.

The conferencing client applications are intended to be run on a client machine as a standalone application, inside a browser, or on a platform specific video conferencing system (e.g. Microsoft Teams Room System, Zoom Room System, and the like). The conferencing applications are primarily used for direct human interaction by means of a web camera, microphone, computer screen, keyboard, and/or pointing device. The conferencing applications offer no or limited possibilities to exchange the video signaling or other data with other applications. Even though all the meeting platforms use world wide web consortium (W3C) standards for backend and peer-to-peer communication the common W3C standards do not make the conferencing applications compatible with other voice and video conferencing equipment that are connected over standard based IP networks and use other protocols like SIP and H.323.

The differences in communication infrastructure between the browser compatible conferencing applications and meeting platforms that rely on dedicated voice and video conferencing equipment connected over standard based IP networks and communications protocols makes it hard and at times impossible to participate in a conference held on a browser compatible conferencing application using existing meeting room equipment.

BRIEF DESCRIPTION OF THE DRAWINGS

The accompanying figures, which together with the detailed description below are incorporated in and form part of the specification, serve to further illustrate various embodiments and to explain various principles and advantages all in accordance with example embodiments of the present inventions.

DETAILED DESCRIPTION

Figure 1:
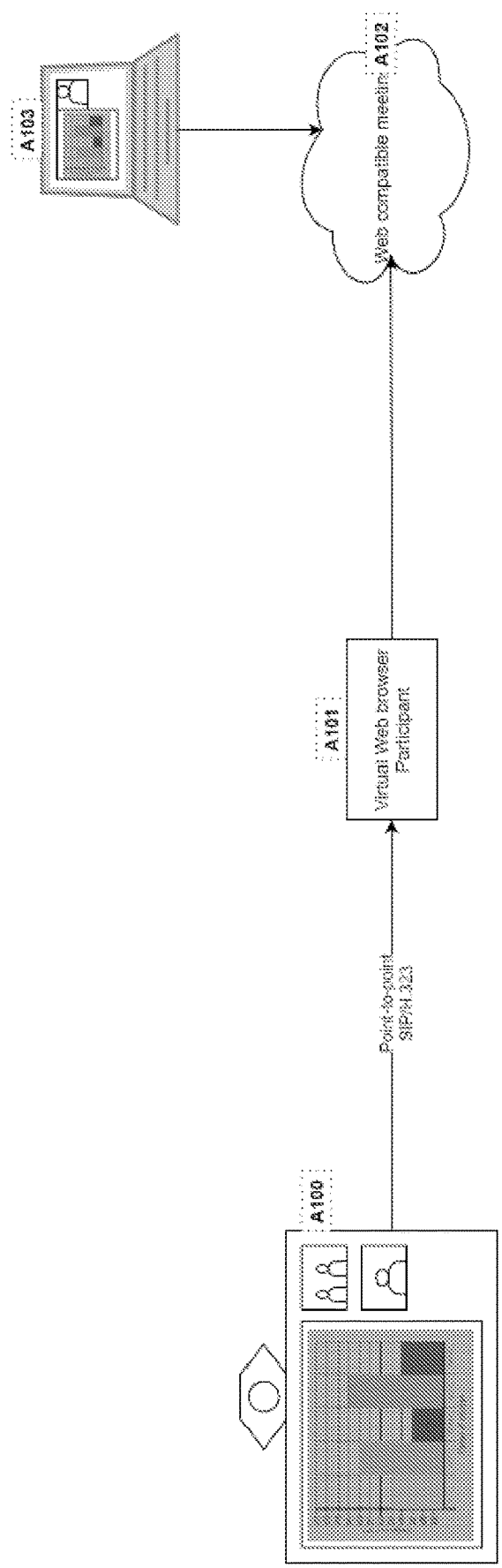
FIG. 1 depicts an example simplified overarching design according to various embodiments of the present disclosure.

While the specification concludes with claims defining the features of the invention that are regarded as novel, the invention will be better understood from a consideration of the following description in conjunction with the drawing figures, in which like reference numerals are carried forward.

The conference platform gatewaying system allows point-to-point conferencing platforms to participate in a meeting on the same level as any client connecting to a web browser compatible conferencing service via a web browser. Point-to-point conferencing platforms may include communication systems that use a peer-to-peer architecture in which session control between communication endpoints is facilitated with SIP, H.323, or other standard based communications protocols. To provide interoperability between meeting room equipment and video conferencing applications running on personal computers, the conference platform gatewaying system may interwork the point-to-point (i.e., SIP, H.323, and the like) technology with the web browser compatible meeting service. For example, the conference platform gatewaying system may interwork a SIP endpoint, H.323 endpoint, or other endpoint included in the point-to-point conferencing platform with the web browser compatible meeting service.

FIG. 1 is a diagram illustrating the high-level functionality of the conference platform gatewaying system. To gateway between point-to-point conferencing platforms and web browser compatible meeting services the conference platform gatewaying system receives a network connection over a network (e.g., the Internet or other internet protocol (IP) based network) from a video conference endpoint of a point-to-point conferencing platform. The video conference endpoint may be, for example, SIP based video endpoint may be a meeting room system consisting of screens, video camera, microphone and speakers communicating utilizing standard protocols like but not limited to H.264 video codec and G.711 audio codec. The connection may be a conference call from a point-to-point video system using SIP or other standard based communications protocols. The conference platform gatewaying system may generate a virtual web browser participant A101 that may connect to a meeting on a web browser compatible meeting service A102. The virtual web browser participant A101 may function as an emulated participant in the meeting that behaves like a web browser. To gateway between the video conference endpoint A100 and the meeting on the web browser compatible meeting service A102, the virtual web browser participant A101 may function as an interface that may align to the W3C standards that are common for meetings on web browser compatible meeting services A102. The virtual web browser participant A101 may interwork the technologies on both sides of the diagram. For example, the virtual web browser participant A101 may interwork SIP and W3C standards for web browser compatible meeting services. The conference platform gatewaying system allows the video conference endpoint A100 to be connected to a browser client A103 (e.g., a W3C compatible browser based client) thru the virtual web browser participant A101 and the meeting on the web browser compatible meeting service A102. The connection provided by the conference platform gatewaying system allows the conference endpoint A100 and the browser client A103 to communicate to with each other with video content, audio content, presentation sharing, and the like.

Figure 2:
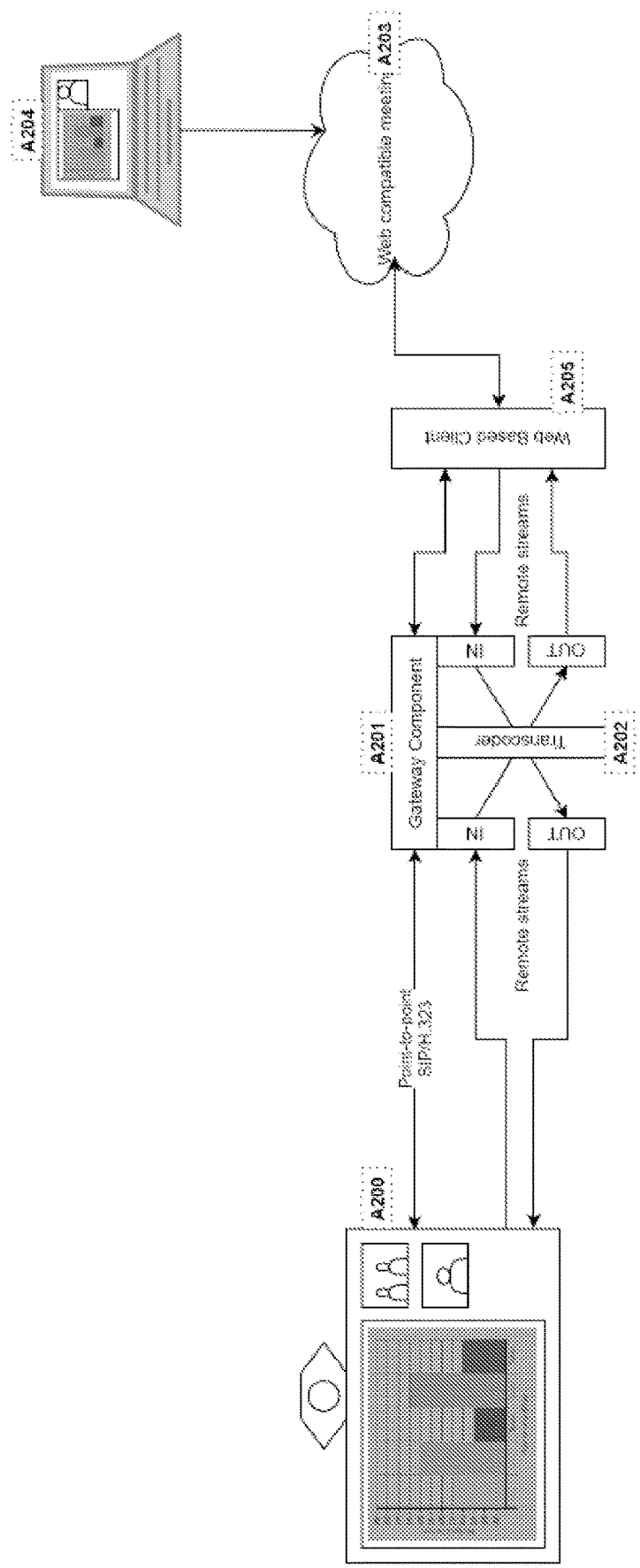
FIG. 2 depicts more details of the design of FIG. 1 according to various embodiments of the present disclosure.

FIG. 2 illustrates more details of the virtual web browser participant included in conference platform gatewaying system. The virtual web browser participant may include a gateway component A201, a transcoder A202, and a web based client A205 that provide the interworking functionality of the virtual web browser participant. The transcoder A202 may resolve the incompatibility of the media codecs that exist between the technologies of the conference endpoint A200 and the browser client A204 by making different codec formats interchangeable. For example, digital media from a conference call from the conference endpoint A200 may be distributed using a G.711 ulaw audio codec, a G.718 audio codec, a G.719 audio codec, a G.722 audio codec, a G.722.1 audio codec, a G.723 audio codec, a G.723.1 audio codec, a G.726 audio codec, a G.728 audio codec, a G.729 audio codec, a G.729.1 audio codec, a H.261 video codec, a H.263 video codec, a H.264 High Profile video codec, a H.265 video codec, or a VC-2 video codec, and/or any other codec that is compatible with the point-to-point conferencing platform hosting the conference endpoint A200. The digital media from a web browser compatible meeting service on a browser client A204 may be distributed using an Opus audio codec, an RTAudio audio codec, a Siren audio codec, a VP3 video codec, a VP6 video codec, a VP7 video codec, a VP8 video codec, a VP9 video codec, a AV1 video codec, an RTVideo video codec, and/or any other codec that is compatible with the web browser compatible meeting service. The different codecs and/or protocols may create a direct incompatibility both in the media capsulation format and also in coding of data for compression and transmission.

The transcoder A202 resolves the incompatibility of the media codecs by unwrapping and decoding incoming data from one codec and encapsulating and encoding data for distribution using another codec. The transcoder A202 enables both conference endpoint A200 and the browser client A204 to communicate directly on their own supported codec format. Accordingly, the conference platform gatewaying system uses the transcoder A202 to ensure compatibility between different technologies (e.g., a point-to-point conferencing platform and a web browser compatible meeting service). The gateway component A201 may distribute signaling between the conference endpoint A200 and the web based client A205 by translating incoming signaling from the conference endpoint A200 into actions performed by the web based client A205. The incoming signal from the conference endpoint A200 may be distributed using a standard based protocol (e.g., SIP, H.323, WebRTC, and the like) and the translated signal generated by the gateway component A201 in the web based client A205 may be an action to connect to a W3C Based conference in the web browser compatible meeting service A203.

Figure 3:
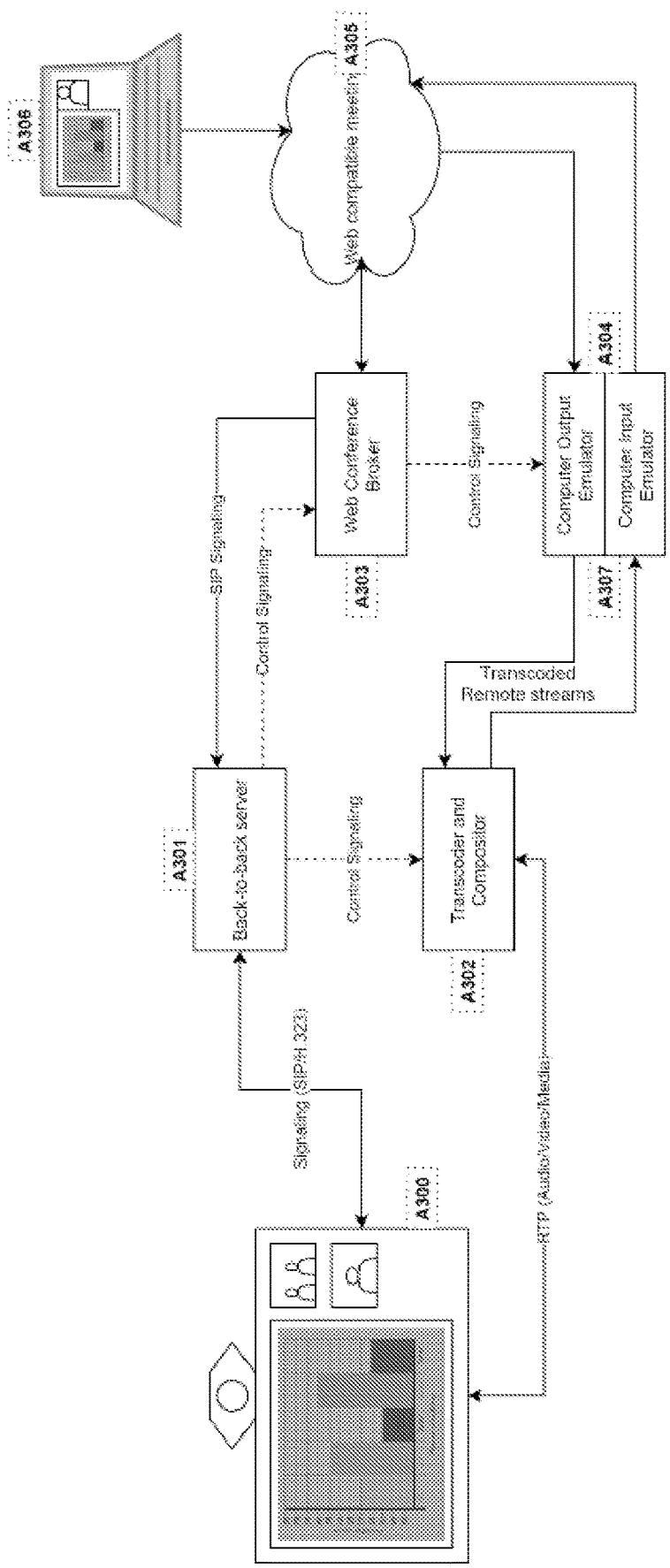
FIG. 3 depicts more details of the design of FIG. 2 according to various embodiments of the present disclosure.

FIG. 3 illustrates more details of the web based client and the transcoder included in the conference platform gatewaying system. The web based client may include a web conference broker A303 and a computer emulator. The computer emulator may include an output emulator A304 and an input emulator A307. The transcoder A302 may include a compositor and an RTP stream receiver and sender which may allow the transcoder A302 to manipulate the video and/or audio network streams in both directions. For example, the compositor may manipulate the video and/or audio streams from the conference endpoint A300 and/or the browser client A306 to determine the number of people participating in the meeting, display subtitles that translate audio streams into one or more languages, distribute text notifications to participants within the meeting, and the like.

The web conference broker A303 may connect to the meeting on the web browser compatible meeting service A305 as a participant and interwork the signal flow back to a back-to-back server A301 which signals to the conference endpoint A300 using a standard based protocol (e.g., SIP, H.323, WebRTC, and the like). The web conference broker A303 may also communicate with the back-to-back server A301 to control the media flow being routed from the output emulator A304 to the transcoder A302. To distribute media to the conference endpoint A300, the output emulator A304 may override the input/output devices in use by the web browser virtual participant (e.g., the W3C standard interface for Media Streams) to enable the use of remote streams to distribute media back to the conference endpoint A300.

When the call from the conference endpoint A300 comes into the back-to-back server A301, the back-to-back server A301 may establish the call and proceed with negotiation of media. The back-to-back server A301 may host the call during the full lifetime of the call. The back-to-back server A301 may also transmit the path of the call to the transcoder A302 to establish the conference endpoint A300 as the media termination point. The data streams (e.g., RTP media flow) from the conference endpoint A300 are received by the transcoder A302, based on control signaling (e.g., a capability exchange in SIP) from the back-to-back server A301 (capability exchange in but not limited to SIP).

To interwork the conference endpoint A300 with the web browser compatible meeting service A305, the transcoder A302 may host a transcoding session that generates transcoded data from the data streams received from the conference endpoint A300. The transcoder A302 may provide the transcoded data to the input emulator A307. The back-to-back server A301 may also provide signaling to the web conference broker A303 that establishes browser connectivity to the meeting on the web browser compatible meeting service A305, and sets up the output emulator A304. For example, the web conference broker may establish browser connectivity to the meeting on the web browser compatible meeting service A305 by accessing a URL of a web browser compatible meeting, downloading the hosted W3C based client (e.g., HTML5, JavaScript, WebAssembly, and the like), and interacting with the executing/interpreted client (e.g., performing user-emulated actions like filling in display name, alter default options, pressing "join"-button, and the like). As the web conference broker A303 waits for the client to connect to the meeting on the web browser compatible meeting service A305, the web conference broker A303 may connect the client back to the output emulator A304 and the web conference broker A303. The connection between the client and the output emulator A304 and the web conference broker A303 completes media flow and interaction flow in both directions between the executing/interpreted client and the web conference broker A303 and the output emulator A304. To interwork the browser client A306 and the conference endpoint A300, media flows between the browser client A306 and the meeting on the web browser compatible meeting service A305. Media from the meeting may be received by the output emulator A304 and the input emulator A307 and may be distributed to the transcoder A302. The transcoder A302 may transcode the media flows into a matching format (e.g., RTP or other standard based content delivery protocols) that is relayed to the conference endpoint A300.

Figure 4:
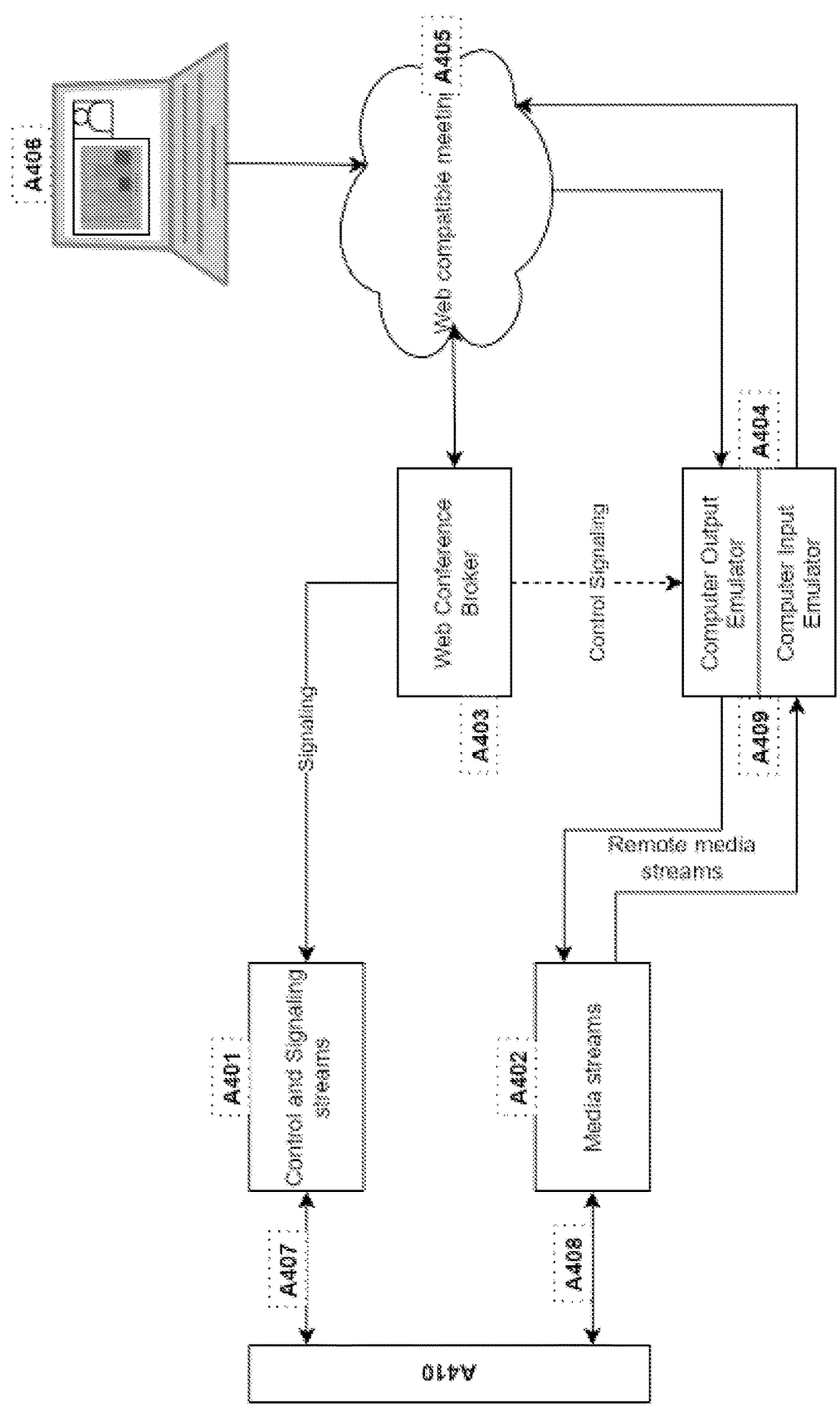
FIG. 4 depicts an example set of core components used to implement the designs of FIGS. 1-3 according to various embodiments of the present disclosure.

FIG. 4 illustrates an example set of components used to implement the conference platform gatewaying service. The conference platform gatewaying service links a web browser compatible meeting service A405 with a point-to-point conferencing system A410 using a web conference broker A403, an output emulator A404, and an input emulator A409. The operation of the point-to-point conferencing service A 410 may be controlled using signaling streams A401 that include one or more signaling protocols A407 (e.g., SIP, H.323, WebRTC, and the like). During a video conference, one or more media streams A402 may be transmitted (e.g., audio, video, and other media) over one or more content delivery protocols A408 (e.g., Real Time Transport Protocol (RTP), Real Time Streaming Protocol (RTPS), and the like) carrying H.263, G.711 and the like.

For conference gatewaying between the web browser compatible meeting service A405 and the point-to-point conferencing system A410, the web conference broker A403 may be in communication with the signaling streams A401 to interpret the signaling from signaling protocols A407 transmitted by the point-to-point conferencing system A410. To join a conference on a web browser compatible meeting service, the point-to-point conferencing system A410 may transmit a signal that causes the broker A403 to perform an action that establishes a connection to the meeting on the web browser compatible meeting service A405. The connection may include a browser client and/or other virtual meeting participant that may join the meeting. The meeting on the web browser compatible meeting service A405 may be a WebRTC compatible meeting that may be accessed by one or more clients (e.g., web browser compatible clients that are accessible by users that are remote from the point-to-point conferencing system A410, i.e., are offsite and/or not on the same network).

During the action performed by the web conference broker A403 that establishes a connection into the meeting on the web browser compatible meeting service A405, an emulator may be set up as a translator of media data. The emulator may include a set of drivers of other software that implements an input emulator A409 and an output emulator A405. The input emulator A409 may translate web media streams including digital content coming from the web browser compatible meeting service A405 into remote media streams that may be consumed by the point-to-point conferencing system A410. The output emulator A404 may translate the remote media streams included in the content delivery protocols transmitted by the point-to-point conferencing system A410 into web media streams that are compatible with the web browser compatible meeting service.

For example, the output emulator A404 may receive remote streams distributed using one or more content delivery protocols A408 (e.g., RTP/RTPS carrying H.263 and G.711) from the point-to-point conferencing system and translate the remote media streams distributed using the one or more content delivery protocols A408 into web media streams A402 that may be consumed by Media Capture and Streams APIs (e.g., W3C, Draft, and the like) that deliver the media to one or more clients A406 connected to the meeting. To deliver web media streams from the one or more clients A406 to the point-to-point conferencing system A410, digital media included in web media streams coming from web browser compatible meeting service A405 may be captured within the W3C interface by either a full canvas rendering of the meeting and/or extractions of available stream channels. The captured digital media may be included in the web media streams that may be fed back to the emulator, and transformed by the input emulator A409 into the remote media streams A402 that are distributed using one or more content delivery protocols A408 that may be consumed by the point-to-point conferencing system A410. In this manner, the emulator and web conferencing broker A403 work together to establish a channel between one or more clients A406 (e.g., a W3C compatible browser-based client or any other client accessible by users of a web browser compatible meeting service A405) and the point-to-point conferencing system A410.

Figure 5:
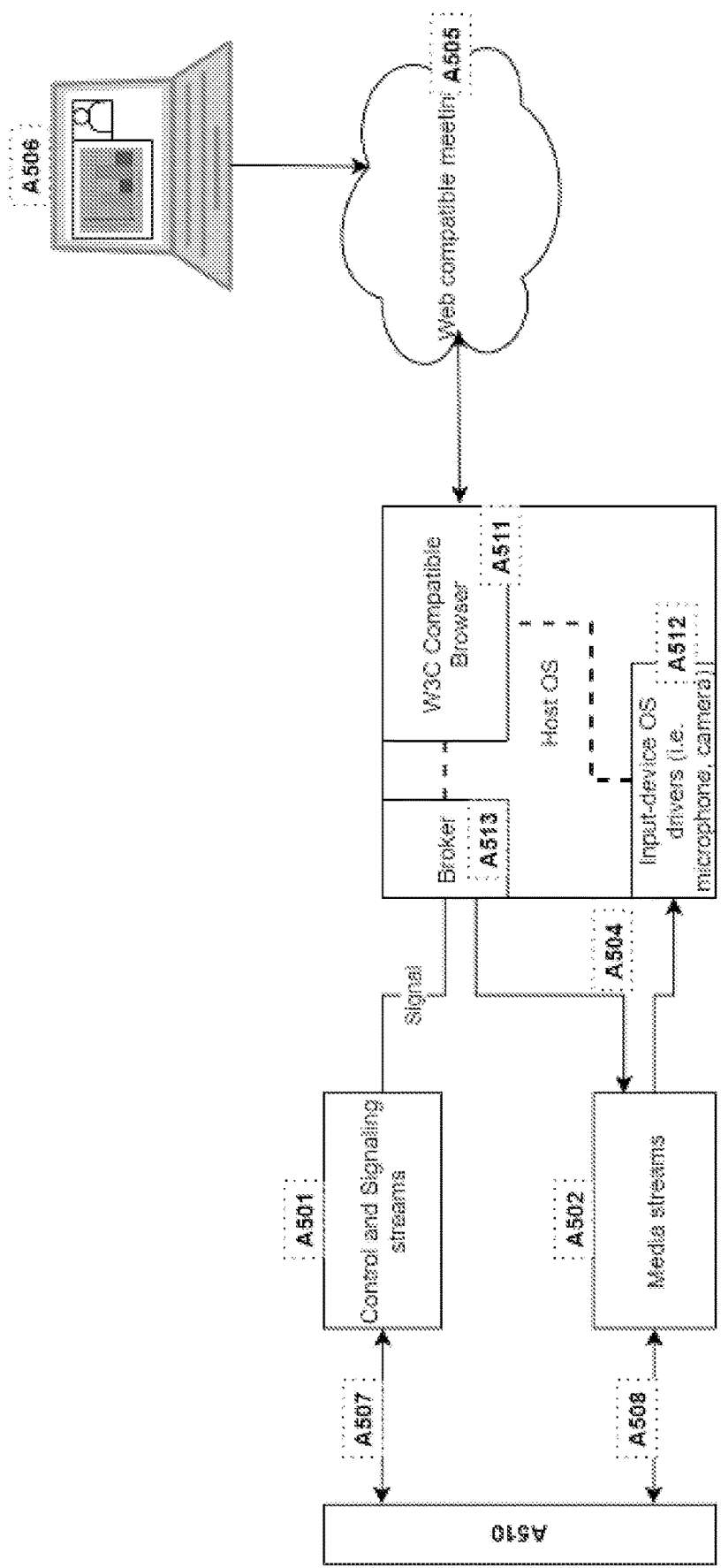
FIG. 5 depicts an alternative example set of core components used to implement the designs of FIGS. 1-3 according to various embodiments of the present disclosure.

FIG. 5 illustrates an example interaction between the broker A513 and the web browser compatible meeting service A505. In various embodiments, different configurations of the broker A513 and/or other components of the conference platform gatewaying system may be used to interwork with the web browser compatible meeting service A505. For example, FIG. 5 shows the broker A513 integrated with a host operating system. As described above, the operation of the point-to-point conferencing system A510 may be controlled using signaling streams A501 that include one or more signaling protocols A507 (e.g., SIP, H.323, WebRTC, and the like). During a video conference, one or more media streams A502 may transmit media data (e.g., audio, video, and other media) over one or more content delivery protocols A508 (e.g., RTP, RTPS, and the like carrying H.263 and/or G.711).

The broker A513 may be integrated into a hosting Operating System (OS) that includes a web browser A511 (e.g., a W3C compatible browser), and one or more input device drivers A512. The input device drivers A512 may include software that mimics the behavior of real hardware (e.g., microphone, camera, and the like) with remote connected media streams. For conference gatewaying between the point-to-point conferencing system A510 and the web browser compatible meeting service A505, the broker A513 receives signals from the signaling streams A501 which may cause the web browser A511 to connect to a meeting on the web browser compatible meeting service A505. For example, the meeting on the web browser compatible meeting service A505 may be a virtual meeting that may be accessed by one or more clients (e.g., web browser compatible clients that is accessible by users that are remote from the point-to-point conferencing system A510, i.e., are offsite and/or not on the same network).

During meeting the web browser A511 behaves in a regular manner, but on request for media devices as described in Media Capture and Streams APIs (e.g., W3C, Draft), the hosting OS propagates a set of bespoke media devices (e.g., virtual input devices and/or virtual output devices including virtual microphones, virtual cameras, and virtual speakers, and the like) that may host the incoming remote media streams A502. The set of bespoke media devices include one or more native operating system (OS) drivers that are connected to the remote media streams A502. The native OS drivers may distribute the remote media streams A502 using one or more content delivery protocols A508 that may be consumed by the point-to-point conferencing system A510. To return remote media streams from the point-to-point conferencing system A510 to the web browser compatible meeting service A505, the broker A513 may use either W3C based canvas scraping or media stream capture as described above to capture digital media on the point-to-point conferencing system A510 and render the captured digital media as one or more web media streams. In this manner the broker A513, web browser A511, and one or more input devices A512 establish a channel between one or more clients A506 (e.g., a W3C compatible browser based client or any other client accessible by users of a web browser compatible meeting service A505) and the point-to-point conferencing system A510.

One challenge with current conferencing platforms is that they are inherently incompatible between each other. Most of the platforms today are computer based, and in cases where they have a meeting room system, the meeting room system is limited to that cloud platform itself. To allow any meeting room system to communicate to other participants on other cloud platforms, a cloud-to-cloud conference platform gatewaying system may resolve the incompatibility issues.

Figure 6:
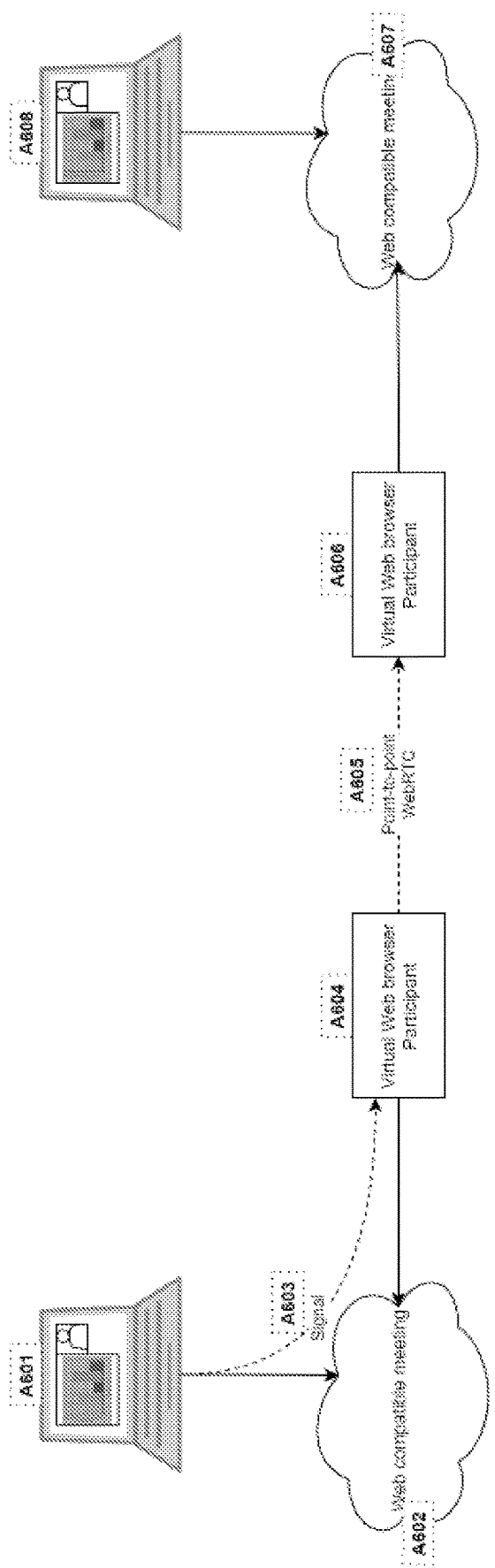
FIG. 6 depicts an example simplified overarching design of a specific use case according to various embodiments of the present disclosure.

FIG. 6 illustrates an example conference platform gateway system that interworks between two or more web browser compatible meeting services. The conference platform gateway system connects two different browser clients A601 and A608 that reside on two different web browser compatible meeting services A604 and A606 that may be on different networks. To interwork between the two different web browser compatible meeting services A602 and A607, the conference platform gateway system may use a uniform resource locator (URL) to URL mapping schema to interwork between the two different web browser compatible meeting services. Each URL in the URL to URL mapping schema may be an entry point for a meeting on one of the web browser compatible meeting services A602 and A607.

To interwork between the different web browser compatible meeting services, a signaling trigger A603 may be generated when a first browser client A601 enters a meeting on a first web browser compatible meeting service A602. There may also be a manual triggered event that imitates demand for a first virtual web browser participant A604. The signaling trigger or other triggering events may originate from a scheduled event (e.g., a meeting booking, sending and/or receiving a meeting invite email, and the like). The signaling trigger A603 may be used as an instruction for the first virtual web browser participant A604 to connect to the first web browser compatible meeting service A602. Once connected, the first virtual web browser participant A604 interfaces with the first web browser compatible meeting service A602 as described above in FIGS. 3-5. The first virtual web browser participant A604 may or may not detect the first browser client A601 in the meeting before connecting out to the second web browser compatible meeting service through a point-to-point connection A605 using WebRTC or another transport protocol that routes communications between multiple virtual web browser participants A604, A606 (i.e., multiple virtual meeting participants). The point-to-point connection may distribute inbound signals from the first virtual web browser participant A604 to the second virtual web browser participant A606. The second virtual web browser participant A606 may react to inbound signals from the first virtual web browser participant A604. The inbound signals may include media streams and other data that are relayed by the second virtual web browser participant A606 to the second browser client A608 connected to the meeting on the second web browser compatible meeting service A607 as described above in FIGS. 1-5.

Due to the open nature of the W3C standard, the platform interconnection may be implemented directly in the platform by the vendor and also from a third party. In instances where the platform vendor hosts the conference platform gatewaying system, the platform vendor may implement a solution directly into their client allowing an external meeting URL to be added to the meeting as users. To implement this solution, upon a user interaction or at a scheduled time, the host vendor may initiate a signaling trigger to engage a virtual web browser participant that connects back to the current local meeting. The host vendor may also connect to a virtual web browser participant of a remote web browser compatible meeting service to interwork to other platforms. For example, the host vendor may connect to a virtual web browser participant of the remote web browser compatible meeting service thru a point-to-point connection as described above in FIG. 6.

In a case where the interoperability is implemented by a third party, a separate solution for triggering the connection may invoke the signaling trigger. In both scenarios the conference platform gatewaying system providing the interoperability is the same, but usage and API implementation differs.

Figure 7:
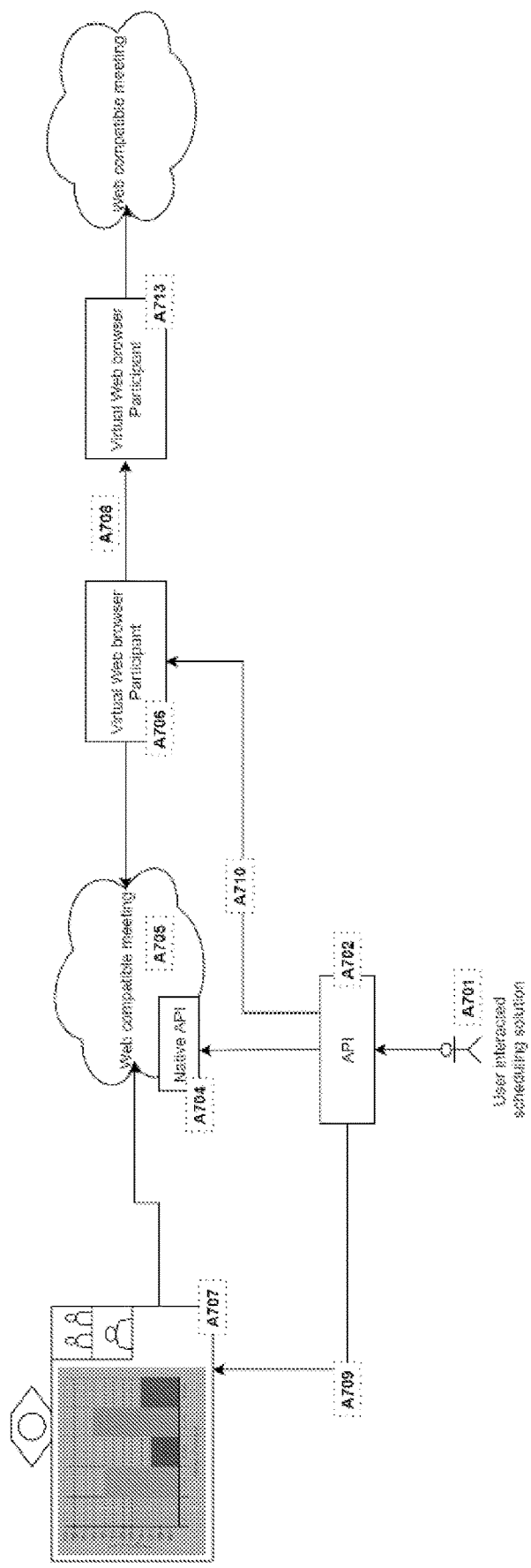
FIG. 7 depicts an example implementation design according to various embodiments of the present disclosure.

For example, FIG. 7 shows a conference platform gatewaying system that allows a platform dependent meeting room system to connect into a conference on another web browser compatible meeting service. To interwork between different web browser compatible meeting services, a calendar platform A701 may push a target meeting URL to an API 702. In some embodiments the target meeting URL may be pushed to the API A702 automatically by the calendar platform A701. The API A702 may create a new meeting on the source meeting platform A705 using the platform's own native API A704 (given that the source meeting platform A705 exposes a native API A704 that allows for creating meetings). The API A702 may also push meeting data A709 including, for example, the returning meeting details to the conference endpoint A707. Similar to the meeting URL, the meeting data A709 allows the end-user of the meeting room to join into the conference easily.

The API A702 also sends a signal A710 including the target meeting URL from the calendar platform A701 to the virtual web browser participant A706 to connect back to the source meeting platform A705. The signal A710 may be sent on scheduled time and/or may be triggered arbitrarily. At any time after the signal A709, the meeting endpoint A707 connects into its supplied meeting on the web browser compatible meeting service A705. The conference endpoint A707 and the virtual web browser participant A706 are now connected in the same meeting on the source meeting platform A705. The virtual web browser participant A706 for the source meeting platform A705 connects over a point-to-point connection A708 to a virtual web browser participant A713 for a destination meeting platform using the supplied meeting URL from the calendar platform A701 and/or the signal A710. The process for connecting the virtual web browser participant A713 to the remote web browser compatible meeting service is the same process as described above in FIG. 3.

Figure 8:
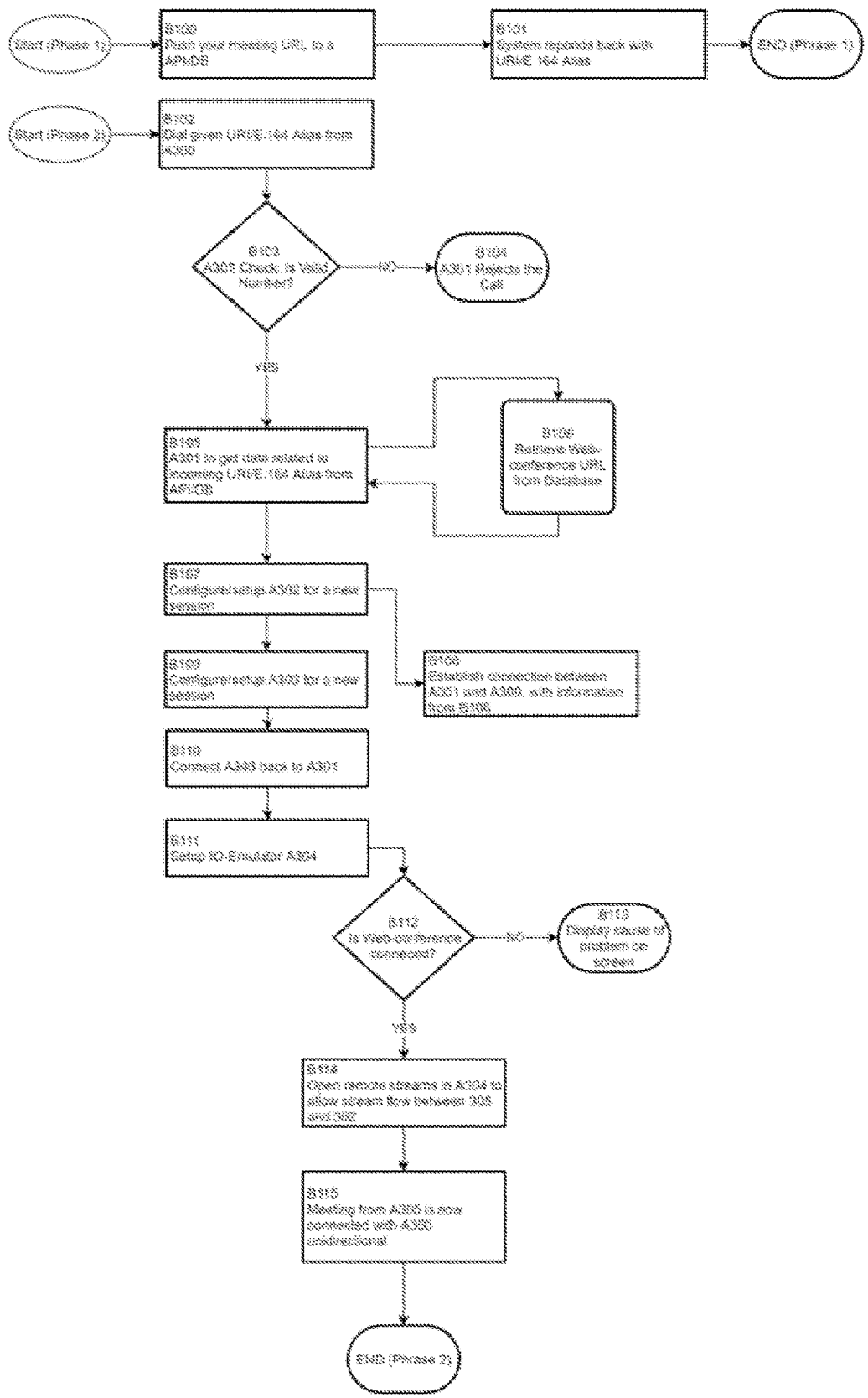
FIG. 8 depicts an example provisioning and connection process according to various embodiments of the present disclosure.

FIG. 8 is a process description of an example implementation of conference platform gatewaying system. At step B100 the system pushes an API/RPC request that provides the meeting URL to a backend system that contains the metadata that may be required as connection details. At step B101 the system responds to the request with a URI that will be used as an access point for the gateway by the connecting peer. For example, the URI may include a E.164 Alias, a SIP URI, a H323 Id, a H323 Alias, an internet protocol (IP) address, and the like. Alternatively, a translation between inbound URI and URL could also be used to achieve the same function.

At step B102 the system uses the information from phase 1 (i.e., step B100 and/or B101) to connect. A connection may be, for example, a SIP based video endpoint dialing a given URI (e.g., meeting@call.com). The SIP based video endpoint may be a meeting room system consisting of screens, video camera, microphone and speakers communicating utilizing standard protocols like but not limited to H.264 video codec and G.711 audio codec. Before the system establishes a connection, a check may be performed at step B103 on the dialed URI/E.164 Alias to early determine to further process the connection. For example, the check may include a strict number validation check on inbound calls as a security layer. On rejection (i.e., the check fails) the call is prematurely terminated at step B104 (e.g., the call could be dropped silently with no response or the call could be terminated with a proper rejection).

At step B105 the system retrieves metadata related to the incoming URI/E.164 Alias from an API and/or database based on the dialed URI. Critical metadata to the URI may include the far-end connecting URL often named "the meeting URL". Other metadata may include a participant name, a meeting PIN, an access code, and the like. At step B106 the system retrieves the web conference URL from a database. The URL may be retrieved using an API/RPC or library call that ultimately serves the previously populated data from a database.

At step B107 the system configures the transcoder/media server for a new transcoder session that belongs to this connection. The transcoder session may be associated with a server port opened on the media server that receives all media traffic from the inbound endpoint (this information may be used later in the SIP service description protocol). The new transcoder session may be created with an API/RPC or library call, that returns data for the transcoder session including, for example, session id, RTP ports, sockets, and the like. The returning data may be distributed into the session description protocol on a SIP connection as a description where the connecting peer can terminate its media streams. The return data may also be used by the transcoder in signaling flow.

At step B108 the system establishes a connection between the connecting peer (e.g., the SIP video endpoint) and the back-to-back server and the transcoder. The connection ensures that the calling endpoint (e.g., the SIP video endpoint) has agreed with the media server on which media codecs to use in the media streams back and forth between the two. There is also established signal communication between the calling endpoint and the back-to-back server. At this point the calling endpoint is in a "connected" state with the back-to-back server and the transcoder even though parts of the system are not completely admitted into the actual conference, due to the back-to-back architecture.

In parallel with step B108, at step B109 the system executes API/RPC call towards a web conference broker including in the payload the "meeting URL". The system may also execute an API/RPC call that includes connection details towards the transcoder at step B107. The web conference broker may initiate setup and admit participants into a given "meeting URL". For example, the web conference broker may connect to a meeting through a meeting URL by launching a W3C compatible browser, automating the URL injection, and allowing the browser to download and execute/interpret the HTML5, JavaScript, and/or WebAssembly based client. Based on type of meeting, specific automation code may be injected in addition to the connection details to ensure correct interaction between elements and features in the meeting platform. For example, automation code providing functionality including entering display name, automatically unmuting on server-side mute, enabling video camera on conferences defaulting to video-off, and the like may be injected by the web conference broker.

The web conference broker may connect back to the back-to-back server at step B110 to allow API, RPC, and/or other Remote control into the web-conference session from the web conference broker. At step B111, the web conference broker may also set up the Input/Output emulator by overriding the standardized native interfaces for hardware interaction. An override in a W3C client may be delivered both by specific OS based drivers that behave like real devices that directly interact with network streams, or by overriding the Media Capture and Streams API (e.g., by using getUserMedia and enumerateDevices). The override may allow the remote network stream from the transcoder to be interpreted as media including, for example, web-camera video and microphone sound. Media received from the web-conference session is extracted and forwarded to the transcoder. Extraction may happen using injection code to render the full application/page down to a single video stream of 25/30 frames per second including receiving sound which is then forwarded over network to the transcoder. Alternatively, each single stream arriving in the interpreted/executing client may be forwarded to the transcoder separately, and then be composed in the transcoder before being transcoded and relayed to the SIP video endpoint.

At step B112, the system may run validation checks to verify the web conferencing platforms are correctly connected. At step B113 the system may display the cause of a problem on the screen if an issue is detected at step B112. To display the cause of the problem the system may include an additional component for publishing video stream and/or pictures with accompanying voice. The media may be streamed directly from permanent storage by the transcoder compositor component to provide audio and/or visual feedback during the connection/setup phase with the web browser compatible meeting service. The browser client may be given audio and/or visual feedback during the connection/setup phase with the conference endpoint.

At step B114, the system patches the data together in the transcoder to provide the media flow between the transcoder and the web browser compatible meeting service. To provide the dataflow, streams may be patched from the input/output emulator to the connection endpoint (e.g., the SIP video endpoint) to give the impression to the users at both the browser client and the connection endpoint that there is a direct channel/connection between the conferencing platforms. The process concludes at step B115 with meeting on the web browser compatible meeting service connected to the conferencing endpoint.

Figure 9:
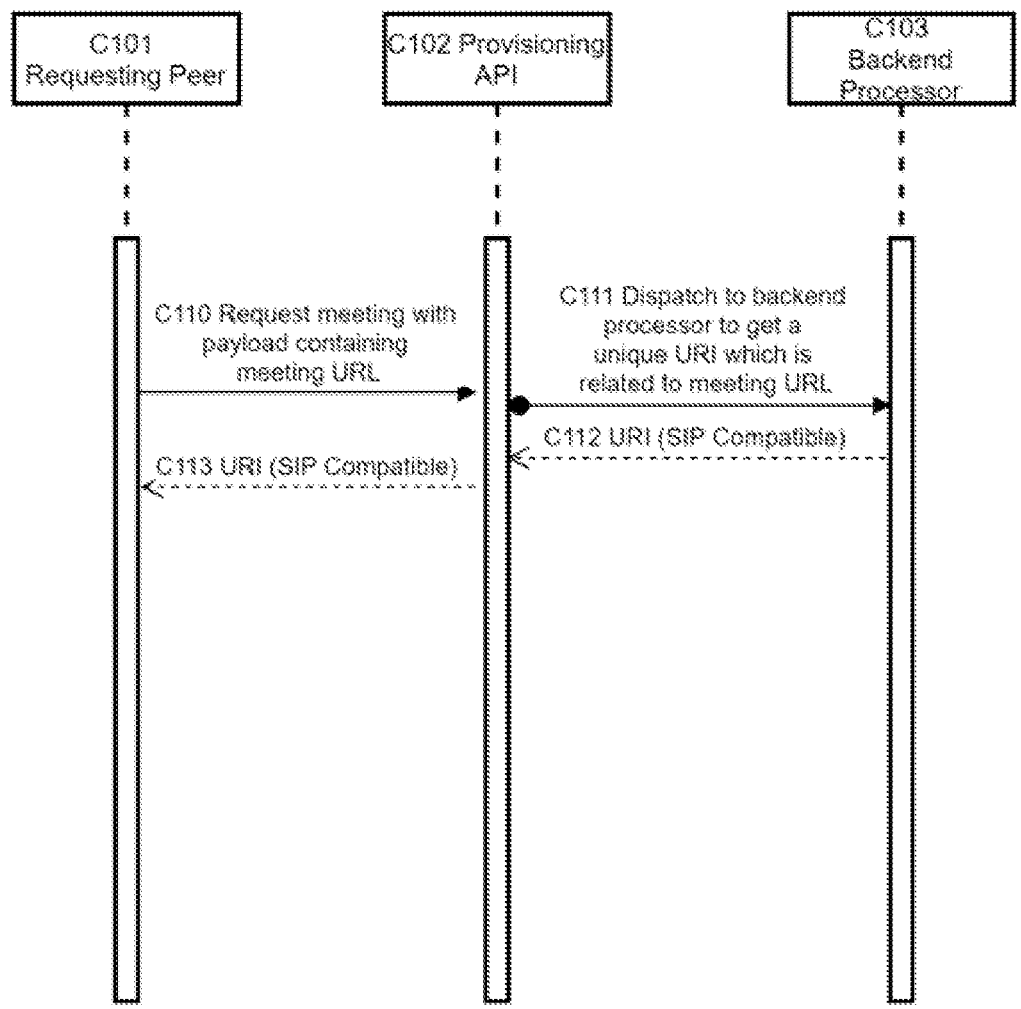
FIG. 9 depicts an example provisioning process flow according to various embodiments of the present disclosure.

FIG. 9 is a signal flow diagram which illustrates the functionality of a provisioning API C102 included in the conference platform gatewaying system. The provisioning API C102 may map a dial-in URI associated with a conference endpoint to a meeting URL associated with a meeting on a web browser compatible meeting service. The conference endpoint may be, for example, a SIP based video endpoint including a meeting room system consisting of screens, video camera, microphone and speakers communicating utilizing standard protocols like but not limited to H.264 video codec and G.711 audio codec. In various embodiments other APIs and/or URI to URL encoders may perform the URI to URL mapping.

To perform the mapping a requesting peer C101 sends an API request to the provisioning API C102 at set C110. The requesting peer C101 may be, for example, a program and/or user and the API request may be, for example, a POST request over HTTPS to an API endpoint like/api/v1/creatememeeting, The API request may include a payload which may include a structured data file, for example, a JSON file having data formatted like {"url": "https://webconference.com/aaabbb"}. At step C111, the provisioning API C102 receives the API request and dispatches the request to a backend processor C103 to get a unique URI that is related to the meeting URL included in the API request. The provisioning API C012 may or may not validate and transform the data included in the API request, before it forwards the request to a backend processor C103. The backend processor C103 may process the received payload and/or request from the provisioning API C102 to generate a result that may include a unique URI. The unique URI included in the result may be randomly generated by the backend processor C103 and/or may be generated using one or more rule based and/or hash-based techniques. The backend processor C103 may also generate the unique URI based on the particular URL included in the request. In step C112, the result generated by the backend processor C103 is passed back to the provisioning API C102. At step C113, the provisioning API C102 prepares a response payload including the result and distributes the response payload back to the requesting peer C101. The response payload may contain the unique URI generated by the backend processor C103. In various embodiments, the provisioning API C102 may also be a two stage asynchronous API which posts requests and then listens for answers. At one stage, the asynchronous API pushes the URI to the requester and at the second stage the asynchronous API adds the meeting URL to the datastore.

Figure 10:
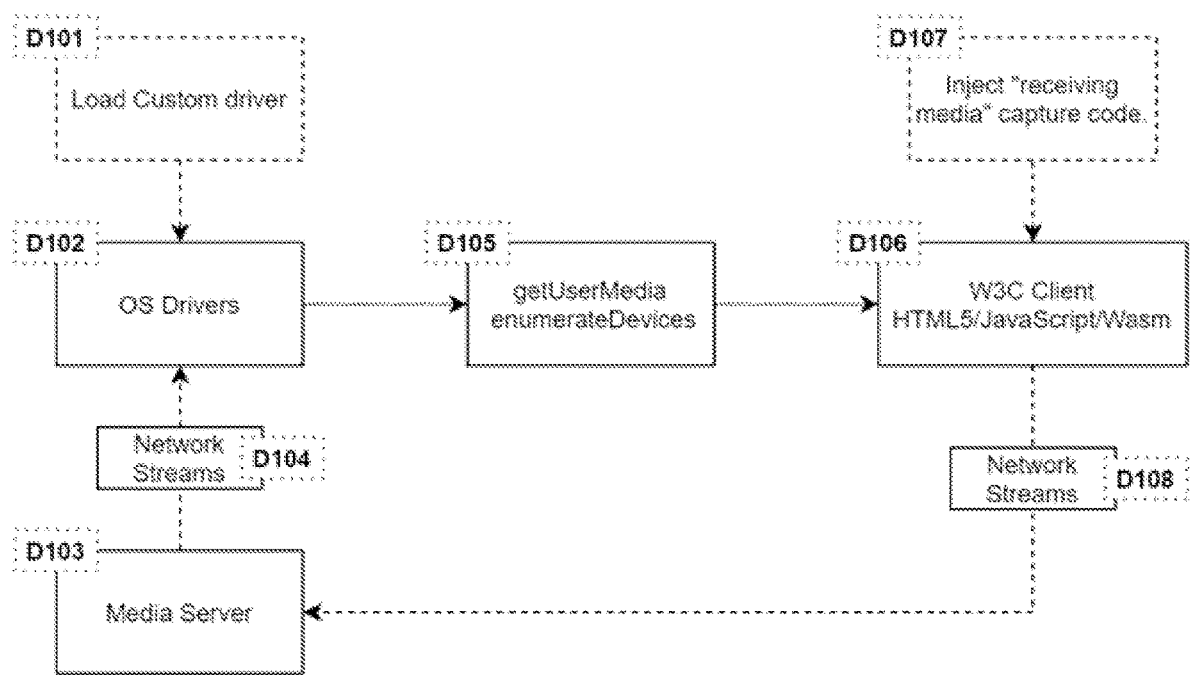
FIG. 10 depicts an example integration process of a browser according to various embodiments of the present disclosure.
Figure 11:
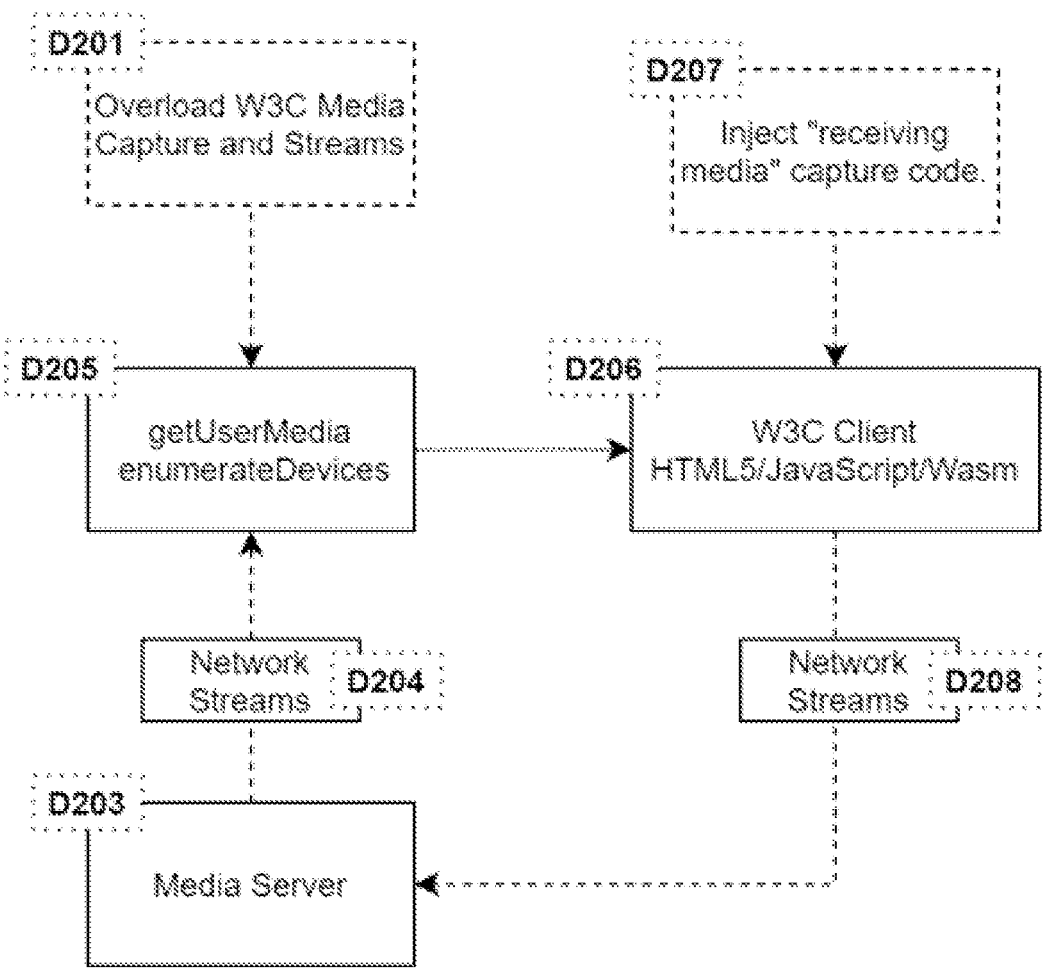
FIG. 11 depicts another example integration process of browser according to various embodiments of the present disclosure.

FIGS. 10-11 describe methodologies for interacting with W3C based conferences. where incoming media may arrive from a remote stream and the outgoing media and/or data from the meeting service may be sent to remote peers.

FIG. 10 is a block diagram that illustrates an OS native driver component that responds to Media Capture and Streams API used by the W3C based browser. One or more instructions D101 may load one or more drivers D102 at the OS level. For example, the one or more instructions D101 may include modprobe or insmod command line tools that are used to load the drivers D102 in Linux OS. The drivers D102 may be a program or other piece of software that creates virtual input/output devices that mimic media devices including web-cameras, speakers, microphone, and other input devices. The drivers D102 may receive media streams D104 over a network, rather than from an actual connected device.

During the startup of the W3C client D106 (e.g., a WebRTC cloud service), the client application utilizes the W3C based Media Capture and Streams API. The initialization of the W3C client D106 may invoke requests that call the drivers D102 loaded by the instructions D101. Drivers D102 ensure that the W3C client D106 has no notion of the difference between an actual hardware and emulated variant of the hardware. One or more client instructions D107 may inject additional code into the W3C based client D106 which enables to W3C based client D106 to receive content including any kind of media like audio, video, presentation sharing, and the like. The client instructions D107 may also be used to capture content from the W3C based client D106, the W3C based client D106 may be rendered as a virtual screen which is then captured to a network media stream D108 that is sent to a media server D103. Content from the W3C based client D106 may also be captured by streaming objects directly from the Media Capture and Streams API and sending the objects from the network media streams D108 to the media server D103.

FIG. 11 is a block diagram that illustrates overloading techniques for capturing content from W3C based client D208. One or more instructions D201 to overload W3C Media Capture and Streams API may initiate one or more enumerate devices D205 that are used to get user media from the W3C based client D208. The instructions D201 generate the enumerate devices D205 before running the W3C based client D206 to create an overloaded variant of the relevant parts of the Media Capture and Streams API. The overloaded variant behaves as the standard API but presents network streams D204, D208 as virtual devices instead of presenting the underlying device drivers. When the W3C based client D206 loads, the W3C based client D206 may request device drivers utilizing the API and the virtual device variants that are bound to the network streams D204, D208 may be returned in response to the request. Content may be captured from the W3C based client using one or more client instructions D207 as described above in FIG. 10.

The conference platform gatewaying system may include other ways to interwork between conference endpoints and web browser compatible meeting services. For example, the conference platform gatewaying system may manipulate the Media Capture and Streams API to allows a remote part to engage in a W3C based conference. To interface with a W3C based conference, the conference platform gatewaying system may overload the Media Capture and Streams API to generate an overloaded variant of the relevant parts of the Media Capture and Streams API. The overloaded variant may behave as the standard API, except the variant may present network streams as virtual devices instead of the underlying device drivers. When the client running the W3C based conference is loaded and requests device drivers utilizing the Media Capture and Streams API, the overloaded API variant generated by the conference platform gatewaying system returns virtual device variants which are directly bound to network streams. The conference platform gatewaying system may also interwork between conference endpoints and web browser compatible meeting services by connecting usage parity compliance devices through interworking.

Figure 12:
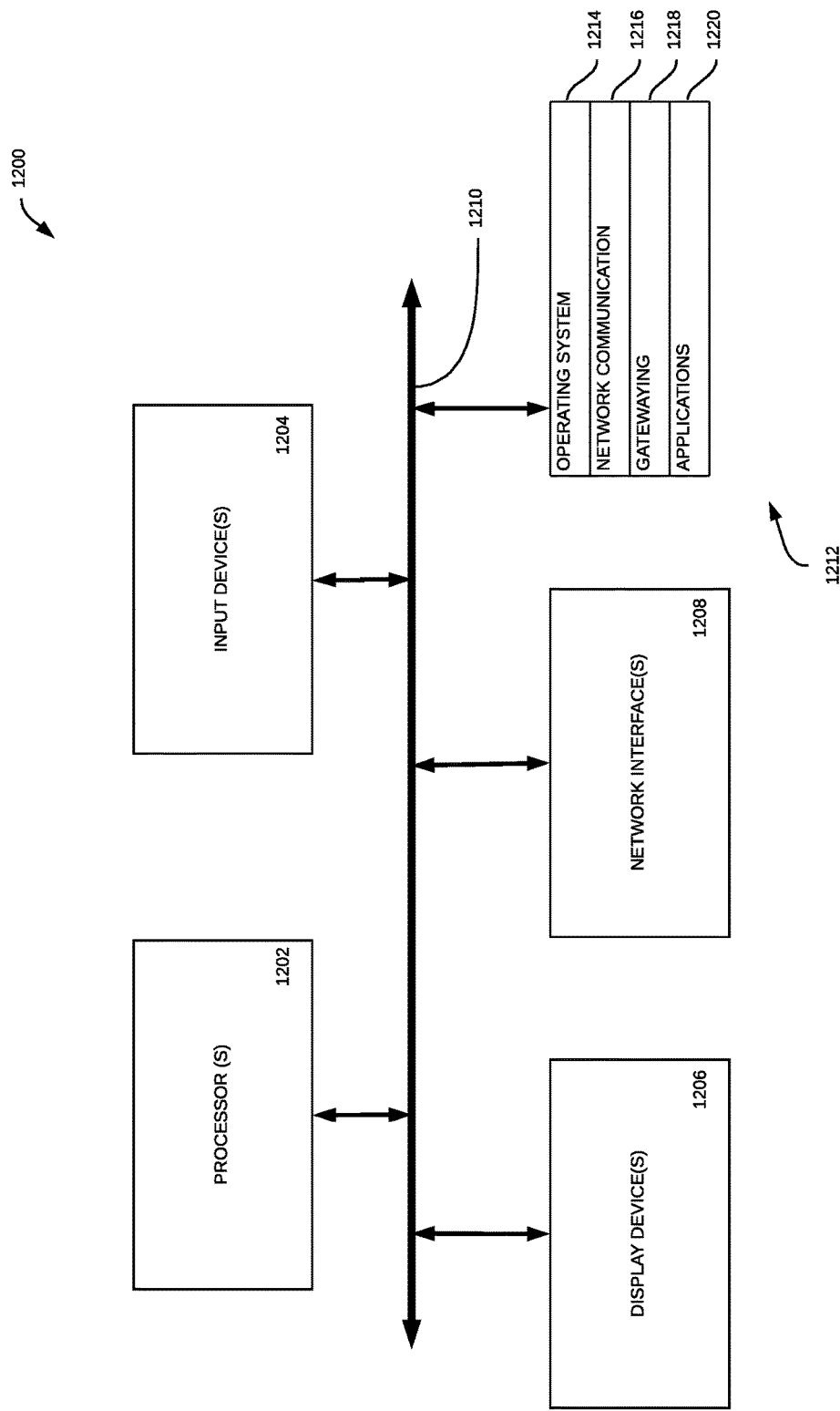
FIG. 12 shows an example computing device according to various embodiments of the present disclosure.

FIG. 12 shows an example computing device according to an embodiment of the present disclosure. For example, computing device 1200 may function as a client device or server. The computing device 1200 may include a conference platform gatewaying service that provides interoperability between meeting room equipment and video conferencing applications running on personal computers. The computing device 1200 may be implemented on any electronic device that runs software applications derived from compiled instructions, including without limitation personal computers, servers, smart phones, media players, electronic tablets, game consoles, email devices, etc. In some implementations, the computing device 1200 may include one or more processors 1202, one or more input devices 1204, one or more display devices 1206, one or more network interfaces 1208, and one or more computer-readable mediums 1212. Each of these components may be coupled by bus 1210, and in some embodiments, these components may be distributed among multiple physical locations and coupled by a network.

Display device 1206 may be any known display technology, including but not limited to display devices using Liquid Crystal Display (LCD) or Light Emitting Diode (LED) technology. Processor(s) 1202 may use any known processor technology, including but not limited to graphics processors and multi-core processors. Input device 1204 may be any known input device technology, including but not limited to a keyboard (including a virtual keyboard), mouse, track ball, camera, and touch-sensitive pad or display. Bus 1210 may be any known internal or external bus technology, including but not limited to ISA, EISA, PCI, PCI Express, USB, Serial ATA or FireWire. Computer-readable medium 1212 may be any non-transitory medium that participates in providing instructions to processor(s) 1202 for execution, including without limitation, non-volatile storage media (e.g., optical disks, magnetic disks, flash drives, etc.), or volatile media (e.g., SDRAM, ROM, etc.).

Computer-readable medium 1212 may include various instructions 1214 for implementing an operating system (e.g., Mac OS®, Windows®, Linux). The operating system may be multi-user, multiprocessing, multitasking, multi-threading, real-time, and the like. The operating system may perform basic tasks, including but not limited to: recognizing input from input device 1204; sending output to display device 1206; keeping track of files and directories on computer-readable medium 1212; controlling peripheral devices (e.g., disk drives, printers, etc.) which can be controlled directly or through an I/O controller; and managing traffic on bus 1210. Network communications instructions 1216 may establish and maintain network connections (e.g., software for implementing communication protocols, such as TCP/IP, HTTP, Ethernet, telephony, etc.).

Gatewaying instructions 1218 may include instructions that enable the computing device 1200 to function as a conference platform gatewaying service that provide interoperability between meeting room equipment and video conferencing applications running on personal computer as described herein. Application(s) 1220 may be an application that uses or implements the processes described herein and/or other processes. The processes may also be implemented in operating system instructions 1214. For example, application 1220 and/or operating system may create tasks in applications as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

This specification describes in detail various embodiments and implementations of the present invention, and the present invention is open to additional embodiments and implementations, further modifications, and alternative and/or complementary constructions. There is no intention in this patent to limit the invention to the particular embodiments and implementations disclosed, on the contrary, this patent is intended to cover all modifications, equivalents and alternative embodiments and implementations that fall within the scope of the claims.

In general, unless otherwise stated or required by the context, when used in this patent in connection with a method or process, data processing system, or logic module, the words "adapted" and "configured" are intended to describe that the respective method, data processing system or logic module is capable of performing the respective functions by being appropriately adapted or configured (e.g., via programming, via the addition of relevant components or interfaces, etc.), but are not intended to suggest that the respective method, data processing system or logic module is not capable of performing other functions. For example, unless otherwise expressly stated, a logic module that is described as being adapted to process a specific class of information will not be construed to be exclusively adapted to process only that specific class of information, but may in fact be able to process other classes of information and to perform additional functions (e.g., receiving, transmitting, converting, or otherwise processing or manipulating information).

As used in this specification, the terms "include," "including," "for example," "exemplary," "e.g.," and variations thereof, are not intended to be terms of limitation, but rather are intended to be followed by the words "without limitation" or by words with a similar meaning. Definitions in this specification, and all headers, titles and subtitles, are intended to be descriptive and illustrative with the goal of facilitating comprehension but are not intended to be limiting with respect to the scope of the inventions as recited in the claims. Each such definition is intended to also capture additional equivalent items, technologies or terms that would be known or would become known to a person of average skill in this art as equivalent or otherwise interchangeable with the respective item, technology or term so defined. Unless otherwise required by the context, the verb "may" or "could" indicates a possibility that the respective action, step or implementation may or could be achieved, but is not intended to establish a requirement that such action, step or implementation must occur, or that the respective action, step or implementation must be achieved in the exact manner described.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer implemented method for connecting two incompatible conference systems over a network, the method comprising:

connecting a first endpoint on a point-to-point conferencing platform to a server;

establishing, by the server, a connection to a meeting on a web browser compatible meeting service, through the web browser, a W3C, or at least one additional interface on the service, the connection including a virtual meeting participant that joins the meeting, wherein the point-to-point conferencing platform and the web browser compatible meeting service are respectively provided by different computing devices and are configured to utilize mutually incompatible connections by respective endpoints;

extracting, by the virtual meeting participant, digital media presented within an audio/visual user interface within the meeting on the web browser compatible meeting service;

rendering, by a computing device that is part of the point-to-point conferencing system, the extracted digital media as one or more remote media streams that are consumed by the endpoint on the point-to-point conferencing platform;

receiving one or more remote media streams from the first endpoint on the point-to-point conferencing platform;

extracting, by the virtual meeting participant, digital media from the one or more remote media streams; and rendering, by a computing device that is part of the web browser compatible meeting service, the digital media captured from the one or more remote media streams as one or more web media streams that are consumed by a second endpoint operating a browser client connected to the meeting on the web browser compatible meeting service.

2. The method of claim 1, further comprising, providing the one or more web media streams to a transcoder;

decoding, by the transcoder, the digital media included in the one or more web media streams incoming from a first codec; and encoding digital media included in the one or more web media streams as remote media streams formatted for distribution using a second codec.

3. The method of claim 2, wherein the first codec includes at least one of a G.711 ulaw audio codec, a G.718 audio codec, a G.719 audio codec, a G.722 audio codec, a G.722.1 audio codec, a G.723 audio codec, a G.723.1 audio codec, a G.726 audio codec, a G.728 audio codec, a G.729 audio codec, a G.729.1 audio codec, a H.261 video codec, a H.263 video codec, a H.264 video codec, a H.265 video codec, or a VC-2 video codec that is compatible with the endpoint on the point-to-point conferencing platform; and the second codec includes at least one of an Opus audio codec, RTAudio audio codec, a Siren audio codec, a VP3 video codec, a VP6 video codec, a VP7 video codec, a VP8 video codec, a VP9 video codec, a AVI video codec, or an RT Video video codec that is compatible with the web browser compatible meeting service.

4. The method of claim 1, further comprising obtaining from a database a mapping between a uniform resource identifier (URI) associated with the endpoint and a uniform resource locator (URL) associated with the meeting; and
establishing the connection to the meeting on the web browser compatible meeting service using the mapping between the URI and the URL.

5. The method of claim 4, wherein the URI includes at least one of a E.164 Alias, a SIP URI, a H323 Id, a H323 Alias or an internet protocol (IP) address; and
wherein the mapping includes additional metadata including at least one of a participant name, a meeting PIN, or an access code.

6. The method of claim 1, wherein the virtual meeting participant further includes a driver that emulates a world wide web consortium (W3C) API; and
wherein the W3C API is a media capture and streams API and the driver is a native operating system driver.

7. The method of claim 1, further comprising generating, by a driver, a virtual input device or a virtual output device that is used by the virtual meeting participant to interact directly with the one or more web media streams from the meeting on the web browser compatible meeting service.

8. The method of claim 1, further comprising launching, by a web conference broker, a W3C compatible browser pointed to a URL associated with the meeting on the web browser compatible meeting service; and
accessing, by the virtual meeting participant, the meeting via the W3C compatible browser.

9. The method of claim 1, wherein the first endpoint on the point-to-point conferencing platform includes a meeting room comprising at least one of screens, video camera, microphone and speakers communicating utilizing a standard communication protocols, wherein the meeting room is accessible using a standard protocol over an IP network.

10. A system for connecting two incompatible conference systems over a network, the system comprising:
a transceiver configured to send and receive one or more media streams;
a conference platform gatewaying service executing on a processor connected to the transceiver, the conference platform gatewaying service configured to:
connect a first endpoint on a point-to-point conferencing platform to a server;
establish a connection to a meeting on a web browser compatible meeting service, through the web browser, a W3C, or at least one additional interface on the service, the connection including a virtual meeting participant that joins the meeting, wherein the point-to-point conferencing platform and the web browser compatible meeting service are respectively provided by different computing devices and are configured to utilize mutually incompatible connections by respective endpoints;
extract digital media presented within an audio/visual user interface within the meeting on the web browser compatible meeting service;
receive one or more remote media streams from the first endpoint on the point-to-point conferencing platform;
and extract digital media from the one or more remote media streams;
render a computing device that is part of the point-to-point conferencing system configured to render the extracted digital media as one or more remote media streams that are consumed by the endpoint on the point-to-point conferencing platform;
and a computing device that is part of the web browser compatible meeting service configured to render the digital media captured from the one or more remote media streams as one or more web media streams that are consumed by a second endpoint operating a browser client connected to the meeting on the web browser compatible meeting service.

11. The system of claim 10, wherein conference platform gatewaying service is further configured to decode the digital media included in the one or more web media streams incoming from a first codec; and encode the digital media included in the one or more web media streams as remote media streams formatted for distribution using a second codec.

12. The system of claim 11, wherein the first codec includes at least one of aa G.718 audio codec, a G.719 audio codec, a G.722 audio codec, a G.722.1 audio codec, a G.723 audio codec, a G.723.1 audio codec, a G.726 audio codec, a G.728 audio codec, a G.729 audio codec, a G.729.1 audio codec, a H.261 video codec, a H.263 video codec, a H.264 High Profile video codec, a H.265 video codec, or a VC-2 video codec that is compatible with the endpoint on the point-to-point conferencing platform; and
the second codec includes at least one of an Opus audio codec, RTAudio audio codec, a Siren audio codec, a VP3 video codec, a VP6 video codec, a VP7 video codec, a VP8 video codec, a VP9 video codec, a AVI video codec, or an RT Video video codec that is compatible with the web browser compatible meeting service.

13. The system of claim 10, wherein the conference platform gatewaying service is further configured to:
obtain a mapping between a uniform resource identifier (URID) associated with the endpoint and a uniform resource locator (URL) associated with the meeting; and
establish the connection to the meeting on the web browser compatible meeting service using the mapping between the URI and the URL.

14. The system of claim 13, wherein the URI includes at least one of a E.164 Alias, a SIP URI, a H323 Id, a H323 Alias or an internet protocol (IP) address; and
wherein the mapping includes additional metadata including at least one of a participant name, a meeting PIN, or an access code.

15. The system of claim 10, wherein the conference platform gatewaying service is further configured to overload a world wide web consortium (W3C) API by a process including presenting the one or more remote media streams as virtual devices; and
wherein the W3C API is a media capture and streams API.

16. The system of claim 10, wherein conference platform gatewaying service is further configured to:
generate a virtual input device or a virtual output device used by a virtual meeting participant that is connected to the meeting, wherein the virtual output device or virtual input device interacts directly with the one or more web media streams from the meeting on the web browser compatible meeting service.

17. The system of claim 10, wherein the conference platform gatewaying service is further configured to:
  launch a W3C compatible browser pointed to a URL associated with the meeting on the web browser compatible meeting service; and
  access the meeting via the W3C compatible browser.

18. The system of claim 10, wherein the first endpoint on the point-to-point conferencing platform includes a meeting room comprising at least one of screens, video camera, microphone and speakers communicating utilizing a standard communication protocols, wherein the meeting room is accessible using a standard protocol over an IP network.

* * * * *